United States Patent [19]

Wisnieff

[11] 4,385,293
[45] May 24, 1983

[54] GRAY SHADE OPERATION OF A LARGE AC PLASMA DISPLAY PANEL

[75] Inventor: Robert E. Wisnieff, Weston, Conn.

[73] Assignee: United Technologies Corporation, Hartford, Conn.

[21] Appl. No.: 101,659

[22] Filed: Dec. 10, 1979

[51] Int. Cl.³ .............................................. G09G 3/28
[52] U.S. Cl. ................................... 340/793; 340/767; 358/240
[58] Field of Search ................ 358/240; 340/767, 793, 340/766, 771, 779, 789

[56] References Cited

U.S. PATENT DOCUMENTS

| | | | |
|---|---|---|---|
| 3,590,156 | 6/1971 | Easton | 358/240 |
| 3,601,532 | 8/1971 | Bitzer et al. | 340/793 |
| 3,733,435 | 5/1973 | Chodil | 358/240 |
| 3,937,878 | 2/1976 | Judice | 340/767 |

Primary Examiner—Marshall M. Curtis

Attorney, Agent, or Firm—Richard P. Lange

[57] ABSTRACT

A circuit for use with an AC plasma panel to cause gray shade or brightness variation at the discrete points on a displayed rastor by varying the number of emitted light pulses within a flicker period. The gray scale range is divided into a predetermined number of levels, each of which corresponds to a particular gray shade. The gray shade level for all of the discrete points along a row of rastor information is stored in binary form in recirculating shift registers. All of the points along each column are addressed simultaneously and the data bits from the recirculating shift registers are used to clock either erase pulses, write pulses, as the case may be, to all of the rows simultaneously as each column is sequentially addressed. Accordingly, by addressing all of the row electrodes simultaneously, all of the discrete sites can be addressed a sufficient number of times within a flicker period to minimize any rastor flicker.

6 Claims, 3 Drawing Figures

GRAY SHADE OPERATION OF A LARGE AC PLASMA DISPLAY PANEL

CROSS REFERENCE TO RELATED APPLICATIONS

This case discloses subject matter which is similar to that disclosed in U.S. patent application Ser. No. 101,660 filed on the same date by the same inventor for GRAY SHADE OPERATION OF SEQUENTIALLY ADDRESSED AC PLASMA PANEL.

TECHNICAL FIELD

This invention relates to an AC plasma display device and, moe particularly, to a circuit configuration for causing the basically bistable gaseous discharge plasma panel to demonstrate intensity variations or gray scale operation.

BACKGROUND ART

Multiple cell AC plasma panels are generally known and are one type of gas discharge panel which are characterized by an ionizationable gas medium, typically a mixture of two or more gases at a suitable gas pressure, disposed in a transparent chamber or envelope on which a multiplicity of electrodes are positioned. The electrodes are normally coated with a dielectric material between which the ionized current flows during the operation of the panel creating a light pulse.

The dielectric layers disposed on the electrodes are significant because the current created by the ionized gas is prevented from actually reaching the electrodes during each half cycle of the operation. As is known, once the arc of ionized gas is struck at a particular discrete site, charges in opposition to the current flow collect on the dielectric surfaces creating an EMF opposing further current flow during that half cycle. During the next half cycle, the process is reversed and charges of opposite polarity build up on the dielectric surface areas that resists electron flow during the next half cycle.

In the construction of an AC plasma panel the multiplicity of electrodes are often positioned in an orthogonal configuration forming a matrix of rows and columns which can be readily addressed to display various types of data. Although the orthogonal configuration is probably the best known electrode arrangement, the electrodes could be arranged in any desired format which might be more convenient for displaying certain types of video data, such as circular electrodes in conjunction with radial electrodes for displaying radar video data and so forth.

A particular problem associated with the use of AC plasma panels, as well as many other solid state panels, is that plasma panels are basically bistable devices, i.e. there are only two modes—on or off. Because of this characteristic, obtaining gray scale variation of the individual discrete areas in the panel has been difficult and a number of different techniques have been used to create the appearance of intensity variations at each discrete panel site, or, as it has become known, gray scale panel operation. Some of the known techniques include:

(1) Multiple sites per resolution area—a plurality of discharge sites are used in each resolvable elemental area and intensity variation is created by increasing or decreasing the number of sites turned on. One such device is disclosed in U.S. Pat. No. 3,886,403 issued May 27, 1975 to Owaki et al. for BRIGHTNESS MODULATION SYSTEM FOR A PLASMA DISPLAY DEVICE. In the system described by Owaki et al a single picture element is made up of a plurality of discharge cells and the perceived brightness is proportional to the total number of discharges of all the cells within a given period. The illusion of brightness is created by lighting that fraction of those cells in each group which correspond to the average instantaneous level at that point on the incoming video signal. In essence, the brightness of the individual area is proportional to the number of discrete elements turned on in that area. A problem with this particular technique is that each area requires a number of lightable sites, that number corresponds to the number of intensity levels, and hence the manufacturing cost is dramatically increased due to the total number of electrodes required for a given resolution. Another way of looking at this approach is that the technique achieves the impression of brightness variation at the expense of resolution.

(2) Amplitude variation of sustainer pulses—a trigger pulse initiates a sequence of discharges which decrease in amplitude until they eventually die out, the average brightness of the light emitted being controlled by varying the magnitude of the trigger pulse hence the decay time. Both U.S. Pat. No. 4,067,047 issued Jan. 3, 1978 to W. Ryan for CIRCUIT AND METHOD FOR GENERATING GRAY SCALE IN GASEOUS DISCHARGE PANELS and U.S. Pat. No. 4,002,828 issued Jan. 11, 1977 to J. Nolan for METHOD AND CIRCUIT FOR GENERATING GRAY SCALE IN GASEOUS DISCHARGE PANELS describe essentially identical techniques for obtaining gray scale variation at each discharge site in a plasma panel. A trigger pulse is applied across the electrodes at a particular site and initiates a discharge sequence which persists for a known period depending on the initial magnitude and duration of the trigger voltage.

(3) Time or duty cycle modulation—each discrete site can be turned on at a selected time within a given period and the intensity is varied by controlling the relative on time. One such system is disclosed in U.S. Pat. No. 3,863,023 issued Jan. 28, 1975 to L. Schmersal et al for METHOD AND APPARATUS FOR GENERATION OF GRAY SCALE IN GASEOUS DISCHARGE PANEL USING MULTIPLE MEMORY PLATES. A multiplicity of memory planes equal in number to the number of gray level ranges to be reproduced is provided. Each memory plane has the same number of storage areas as the number of storage and discharge areas that the display panel has. An image is scanned and the picture elements are separated into a finite number of shades of gray, equal in number to the number of memory planes provided. Each memory element is stored in its proper sequence in a memory plane associated with the shade of gray that the picture element corresponds to and the contents of the memory plane are then sequenced into the panel to reproduce the original picture. A problem with this technique is that the number of memory planes required is equal to the number of gray shade levels so that, for example, an eight gray shade system requires a memory with eight times the number of picture elements in the display. In addition, all of the elements of the panel are periodically extinguished so that the entire write cycle, which requires addressing each element of the panel individually, must be accomplished within one flicker period, or approximately sixteen milliseconds. For example, if a sustainer frequency of approximately 60 kilohertz is employed, this approaching the upper possible frequency limit for a plasma panel because of the physical constraints of plasma initiation and decay, and this sustainer frequency is combined with an optimum addressing system so that a discrete element is addressed on each sustainer cycle. Then, the maximum number of picture elements in the panel would be only approximately 1,000. In general, this size of a display is too small for a large rastor, such as a TV rastor or the like.

Also of general interest in this letter category is U.S. Pat. No. 3,975,661 issued Aug. 17, 1976 to Kanatani et al. for DRIVING METHOD FOR A THIN-FILM ELECTROLUMINESCENT ELEMENT OF A THREE LAYER CONSTRUCTION; U.S. Pat. No. 4,021,607 issued May 3, 1977 to Y. Amano for VIDEO DISPLAY SYSTEM EMPLOYING DRIVE PULSE OF VARIABLE AMPLITUDE AND WIDTH.

DISCLOSURE OF INVENTION

It is an object of the present invention to provide a low cost circuit configuration for use with a large AC plasma panel to provide intensity variations at each discrete site without introducing apparent flicker in a displayed raster.

Another object of the present invention is to provide a circuit configuration for demonstrating gray shade variation in a plasma panel by use of a technique which addresses all of the row electrodes along one column electrode simultaneously to either write, erase, or not change, the preexisting state at each site so that during a flicker period gray scale variations are perceived by the integration of the eye.

According to a feature of the present invention, an analog video signal in a raster format has an amplitude which varies in accordance with the desired gray scale at each point along the raster. This analog video signal is quantized and stored in a simple recirculating memory. The output from the memory is used to clock write pulses and erase pulses to all of the row electrodes simultaneously along each column of the plasma panel. Each column electrode is sequentially addressed while all of the column electrodes are simultaneously addressed. Each discrete site can thus be written for a predetermined number of sustainer cycles related to the desired gray scale level within a flicker period.

BRIEF DESCRIPTION OF DRAWING(S)

BEST MODE FOR CARRYING OUT THE INVENTION

Figure 1:
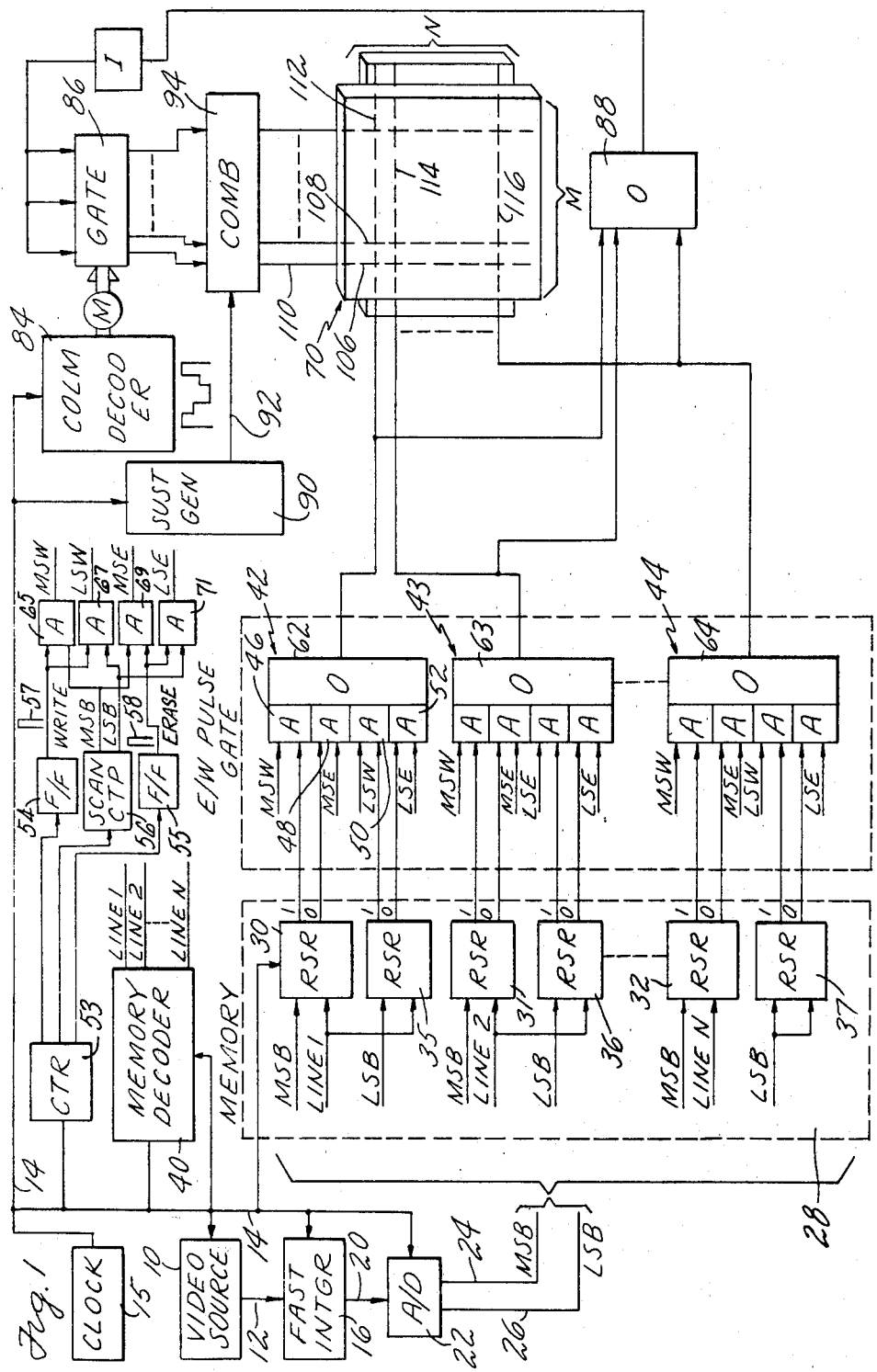
FIG. 1 is a block diagram of an embodiment according to the present invention for simultaneously addressing all of the row electrodes in a large plasma panel to obtain gray scale operation.

One embodiment of a circuit configuration according to the present invention for creating gray scale variations in an AC plasma panel will now be described. Referring initially to FIG. 1, a video source 10 is provided and could be one of a multitude of known video sources which are capable of either generating analog video information, e.g. a TV camera, or storing analog video information generated from other sources, e.g. video recorders. In any event the video source 10 provides a time varying analog signal, having a magnitude varying in proportion to the light intensity at a given point in a raster, at its output on line 12; and, this signal synchronously clocked out under control of a clock signal presented via the line 14 by a clock 15. The analog video signal is presented to a fast integrator 16 which integrates the analog video signal over a predetermined interval of time and provides a quantized output signal proportional to such integration which assumes one of a number of preselected levels. The number of preselected levels is related to the desired number of gray shades that are to be displayed by the plasma panel, i.e. if four gray shades are to be displayed, the output of the integrator will have at least four distinct levels. At the end of each integration interval the fast integrator 16 is reset by a clock signal on the line 14 from the clock 15. The quantized output signal from the fast integrator 16 is then presented by a line 20 to an A/D convertor 22 which transforms the quantized levels of input video information to a binary format for presentation by a line 24 and a line 26 to a memory 28 where the data is stored.

A particular feature of the present invention is that it employs a simple memory organization technique in conjunction with a composite column addressing scheme to present and update the information displayed by the plasma panel. Typically, a plasma panel includes a large number of column electrodes and a large number of row electrodes. The precise number of either column electrodes or row electrodes is normally related to the available vertical and horizontal resolution of the video information from the video source 10. Referring still to FIG. 1, a simple form of memory format is shown for a plasma panel that has N rows of electrodes and M column of electrodes. A plurality of recirculating shift registers, such as recirculating shift register 30, 31, and 32 equal in number to 2 N are provided a four gray shade system. One half of the recirculating shift registers comprise a first group and each is connected to the line 24 for receiving the most significant bit corresponding to the quantized video level at a particular period in the raster. In a similar manner, a second group of recirculating shift registers, such as recirculating shift register 35, 36, and 37 are provided and each is connected to the line 26 to receive the least significant bit corresponding to the quantized video level during a particular period in the raster to be displayed. As is apparent, each pair of recirculating shift registers for each of the N columns contain one row of video information.

Each of the recirculating shift registers are normally identical and selected such that it has a storage capacity of at least M bits, or a capacity equal to the number of columns of the plasma panel. A memory line decoder 40 is provided and is synchronously driven by the clock 15 in conjunction with the video source 10. The memory line decode has a plurality of output lines N, equal in number of row electrodes, and each output line is connected to one pair of recirculating shift registers. For example, line 1 from the memory line decode 40 is connected to the recirculating shift registers 30 and 35, etc. The memory line decode operates synchronously with the video source 10 and sequentially enables each pair of recirculating shift registers to update the stored information as the appropriate row of video information is clocked out of the video source 10. When not updating stored information from the video source, the stored data in each shift register is synchronously recirculated under control of a clock signal provided to each recirculating shift register through the line 14.

An E/W pulse gate is provided and includes a logic circuit for properly combining the outputs of each of the recirculating shift registers with appropriate write or erase pulses to either initiate or extinguish a discharge at a particular discrete site. As mentioned, a pair of recirculating shift registers is provided for each row of the plasma panel and the bits corresponding to the gray shade level in digital form are continuously circulated therethrough. A pulse counter 53 activates a pair of bistable devices, such as flip-flop 54 and 55, to generate a train of write pulses 57 and erase pulses 58, respectively. A scan counter 56 is also connected to the pulse counter 53 and sequentially counts each raster to determine which raster scan is scheduled to be either written or erased according to the weight of the stored data. A simple logic circuit comprising AND's 65, 67, 69, and 71 is provided to gate the write and erase pulses to a particular discrete site on a raster-by-raster basis. Accordingly, the AND 65 has one input connected to the flip-flop 54 to receive write pulses while a second input is connected to the MSB output of the scan counter 56. The AND 67 also receives write pulses at one input from the flip-flop 54 and has a second input coupled to the LSB output from the scan counter 56. The AND 69 has one input connected to the flip-flop 55 to receive erase pulses while a second input is connected to the LSB output of the scan counter 56. Finally, the AND 71 has one input connected to the flip-flop 55 to receive erase pulses while a second input is connected to the LSB output of the scan counter 56.

A plurality of logic circuits such as logic gates 42, 43, and 44 are provided and each is coupled to one pair of recirculating shift registers. For example, the logic gate 42 includes an AND 46 which has one input connected to one output of the recirculating shift register 30 while an AND 48 has one input connected to an inverted output from the recirculating shift register 30. The gate 42 also includes an AND 50 which has one input coupled to an output of the recirculating shift register 35 while an AND 52 has one input coupled to the inverted output of the recirculating shift register 35. Each logic gate receives a write and erase pulse related to each raster scan, e.g. one input of the AND 46 receives MSE write pulses and one input of the AND 50 receives LSW erase pulses. In a similar manner, one input of the AND 48 receives MSE erase pulses and one input of the AND 52 receives LSE erase pulses. Each of the logic circuits also includes an exclusive OR at the output, such as OR 62 positioned at the output end of the logic gate 42, the OR 63 positioned at the output end of the logic circuit 43, and the OR 64 positioned at the output end of the logic gate 44, to insure that only one pulse is presented to each site. Therefore, the E/W pulse gate utilizes the output data from the recirculating shift registers in the memory to gate the write and erase pulses to the plasma panel, this process occurring in synchronism with the addressing of the discharged sites in the plasma panel.

The M column electrodes of the plasma panel 70, such as column electrodes 106, 108, and 110 are addressed sequentially while the N row electrodes, such as row electrodes 112, 114, and 116, are addressed in parallel. Each of the row electrodes is connected to one of the logic gates in the E/W pulse gate; that is, the row electrode 112 is connected to the logic gate 42, the row electrode 114 is connected to the logic gate 43 and the row electrode 116 is connected to the logic gate 44. The column decoder 84 is connected to line 14 so that it is synchronously driven by the clock 15 and sequentially enables each of the gates in the gates unit 86, this unit having one gate for each column electrode in the plasma panel 70. One input to each gate is from an exclusive OR 88 which is connected to the N outputs from the E/W pulse gate so that only one column electrode is addressed at one time. A sustainer generator 90 is connected to the line 14 so that it is synchronously driven by the clock 15 and generates a signal waveform on the line 92 for presentation to a combiner 94 which presents the sustainer signal waveform to the column electrodes.

Figure 2:
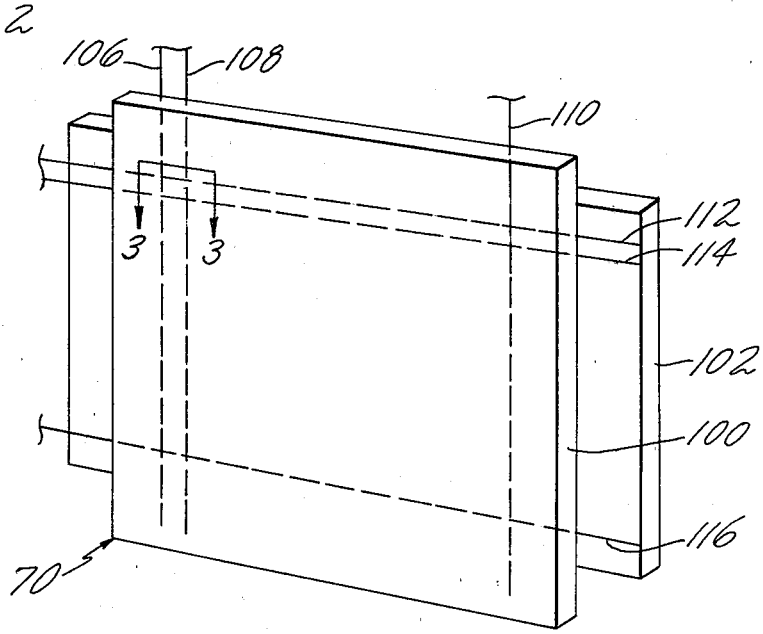
FIG. 2 is an isometric view of a typical plasma panel.
Figure 3:
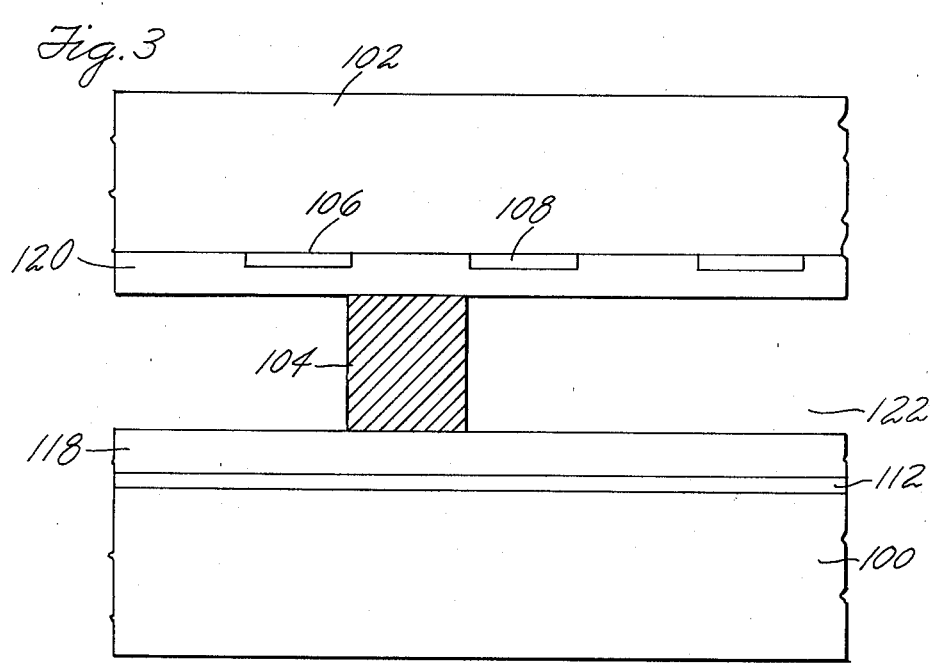
FIG. 3 is a partial cross-sectional view of FIG. 2 (enlarged, but not in proportion) showing the internal arrangement of a plasma panel.

Referring now to FIGS. 2 and 3, a typical embodiment of an AC plasma display panel for use in conjunction with the gray shade circuit of the present invention will now be described. The plasma panel 70 normally includes a pair of substrate members 100 and 102, both of which can be fabricated from a glass such as a commercial grade lime plate glass, or other similar glass. As is known, the substrate members 100 and 102 provide the majority of the mechanical panel strength and the entire face panel must be capable of handling the gas pressure differential across the face with a minimal flexure. Because of this strength requirement, normally it is these substrate members that essentially define the overall thickness of the plasma panel. The substrate members 100 and 102 are most often separated by a spacer 104 (FIG. 3) and the exact separation between the two substrate members is critical and is relatively small, on the order of 5 mills, when compared to the thickness of each substrate. Furthermore, in addition to providing the strength to form a rugged panel, particularly in the larger display panels, the substrate members also serve as heat sinks for dissipating the heat generated by the electrical discharge between the two electrodes and thus the heat transfer capability of the substrates is important for enchancing the ability of the panel to operate over a wide range of ambient temperatures.

As is best seen in FIG. 2, the plurality of column electrodes, such as column electrodes 106, 108, and 110, are normally positioned on one substrate, such as substrate 100, while a plurality of row electrodes, such as column electrodes 112, 114, and 116, are positioned on the other support member 102. Typically, the plurality of row and column electrodes are positioned in an orthogonal configuration and the spacing therebetween is related to the resolution of the video information being displayed. All of the electrodes are preferably fabricated from conductive material, such as gold or aluminum, and may be deposited on the substrates by numerous well-known processes such as vacuum deposition, stencil screening, photo etching, etc. Although tin oxide or indium oxide is desirable for the fabrication of electrodes because of the transparent or semitransparent characteristic, the higher resistivity of this material generally limits their use to smaller panels. If the electrodes are fabricated from the more opaque metals, the width of each individual electrode would normally be as thin as reasonably possible so that the light discharged at each discrete site will not be blocked on its route through the substrate to the viewer.

As is best seen in FIG. 3, a dielectric layer 118 and a dielectric layer 120 are positioned on substrates 100 and 102, respectively, thus coating the surface of each electrode. The material forming the dielectric layer is preferably selected so that its thermal expansion characteristics somewhat match the thermal expansion characteristics of the material forming the substrate members 100 and 102. The dielectric layers should be smooth, without cracks, holes, dirt, or other surface imperfections so that it will have a relatively constant breakdown voltage, e.g. on the order of 1,000 volts. In that electron flow occurs through the space in the envelope formed by the substrate members, the dielectric material should also have good electron emissive capability, or alternatively, both of the dielectric layers 118 and 120 may be covered with an overcoat designed to produce such electron emission. As would be expected, the dielectric material and overcoat, if any, should be relatively transparent in that the light generated between the electrodes needs to pass through one panel sidewall to the viewer.

The two substrates 100 and 102 are spaced apart from each other by a spacer 104 and define a closed envelope or chamber 122 which can be hermetically sealed. The spacer 104 is side and positioned between the substrates 100 and 102 to maintain a constant separation between the electrodes. In the manufacturing process, the chamber 122 is sealed around the outside edge of the panel and then evacuated so that the chamber can be filled with an ionizationable gas. A number of gases, or gassed mixtures, are known to be suitable as a gaseous discharge medium for a plasma panel; these mixtures could include neon, helium, argon, krypton, xenon, or other noble gases. In the operation of an AC plasma panel, an electrical potential of a certain minimum magnitude is impressed on one column electrode and on one row electrode, or as in the present invention on a plurality of row electrodes, to form a sufficient voltage gradient to cause ionization of the gas thus producing a light generating discharge at the discrete site defined by the electrodes. The one of the two electrodes which is relatively positive collects electrons on the surface of its dielectric coating adjacent to the discharge site, while positive ions collect on the dielectric coating of the relatively negative electrode at the opposite end of the discharge site. Finally, as the magnitude of these respective charges increases, a back voltage opposing further current flow causes a termination of the discharge through the discharge site until the relative potential between the two electrodes reverses at the next half cycle of the sustainer frequency this discharge through the gas medium which produces the light pulse only lasts for a very short period of time, normally less than a microsecond, and additional light will not be omitted until the voltage differential across the two electrode sites is reversed at the beginning of the next half cycle of the sustainer waveform.

Figure 4:
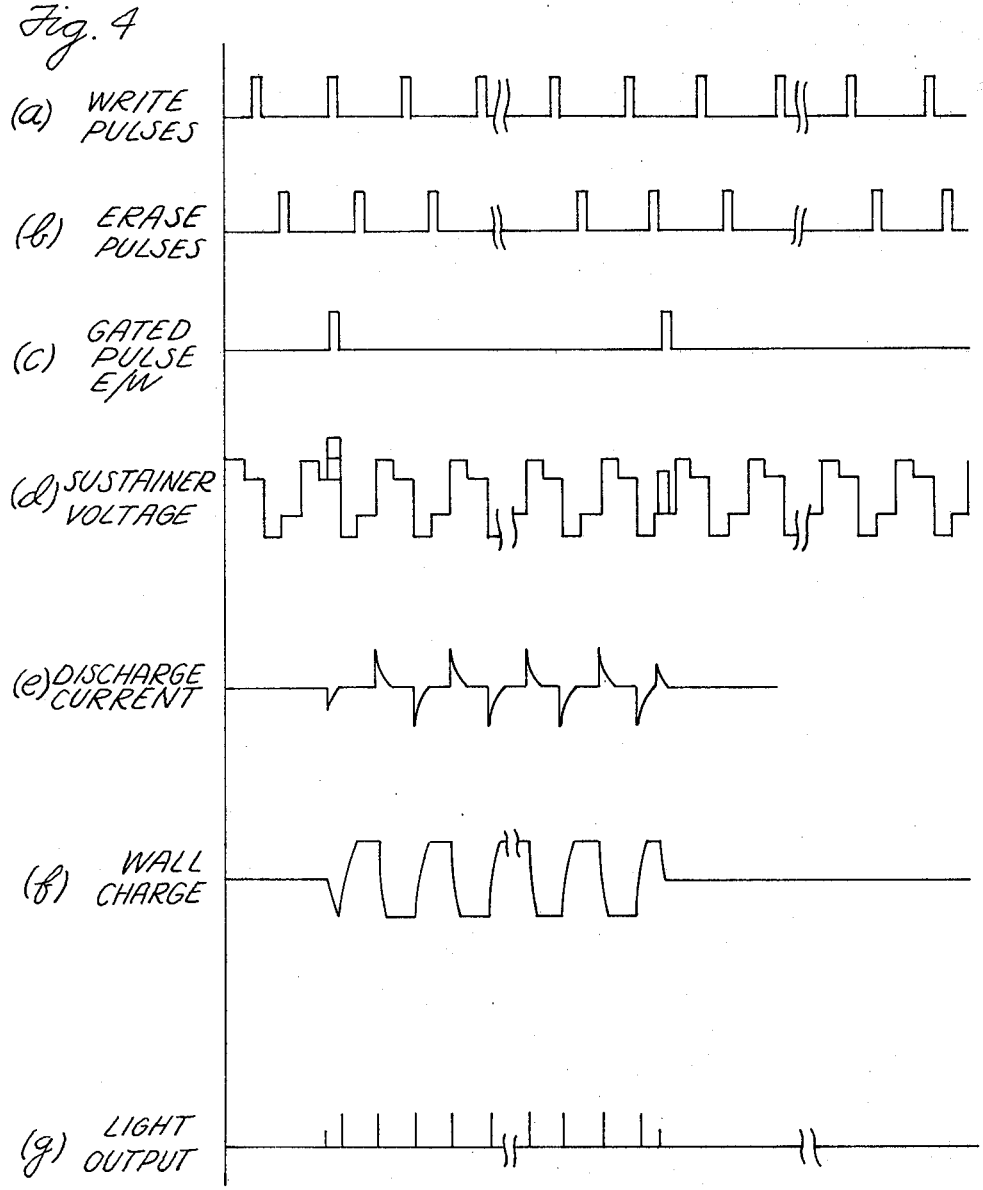
FIG. 4 is a plot versus time of various waveforms at certain points in the embodiment of the gray scale circuit according to the present invention.

Referring now to FIG. 1 in addition to FIG. 4, the operation gray shade circuitry according to the present invention will now be described. As mentioned herebefore, the video source 10 is a source of analog video information which is to be presented in a raster display on the plasma panel 70. The analog video signal may be of the type where one complete raster scan of all of the discrete sites requires about 16 milliseconds. As is known, this translates to approximately 60 rasters per second which is near the lower end of the desired frequency for obtaining a flicker-free display. The magnitude of the video analog signal may be either directly proportional, or inversely proportional, to the desired intensity or gray shade of each point in the raster, i.e. the magnitude of the video signal is related to the desired intensity of a particular point on the face of the plasma panel 70. The fast integrator 16 is reset by a clock signal at the beginning of each integration period and provides an output signal which is proportional to the integrated analog video signal during the integration period. It should be understood that the analog video signal may be quantized into any desired number of distinct levels but, as would be expected, an increase in the number of recirculating shift registers in the memory 28, and logic elements for each line would be required. The A/D 22 converts the quantized signal from the fast integrator 16 into binary form for storage in the memory shift registers. The memory line decoder addresses each pair of recirculating shift registers in sequence so that a complete line of video data is stored in each pair of shift registers. Of course, previously stored video information is updated with the current information as each line of video information is clocked out of the video source 10.

A significant feature of the present invention is that the data bits recirculating in the memory in synchronism simultaneously clock either write pulses, erase pulses, or no pulse at all, to all of the discrete sites in the plasma panel 70 along one column. As mentioned herebefore, a series of write pulses and erase pulses are supplied by the logic circuitry associated with the scan counter 56 are presented to each logic gate of the E/W pulse gate. The write pulses are so timed that when clocked out of the logic circuitry to a particular discrete site in the plasma panel 70, each write pulse is positioned on the back porch of the sustainer voltage waveform (illustration b of FIG. 4). Here it should be understood that both the write and erase pulses are simultaneously presented to the row electrode and the column electrode corresponding to each site. In addition, one of the pulses is presented through an inverter so that when combined at the site on the back porch of the voltage waveform, the voltage difference is additive which is sufficient to cause a site discharge. A write pulse 58 has a relatively short duration and the combined pulse has a magnitude which is greater than the sustaining voltage waveform so that, if presented to all the sites not struck along one columm, the effect is to cause ionization in the gas. As the ionizing current flows, the electrons and ions alternatively accumulate on the dielectric surfaces of the electrodes defining each discharge site which ultimately produces an opposing electrical field. However, in that the polarity of the sustainer voltage periodically reverses, the wall charge adds to the sustainer voltage waveform at this point producing another discharge as the current flows in a reverse direction. As is apparent, once the individual sites along each column are struck by a write pulse, repetitive discharges will continue indefinitely as the sustainer voltage is applied at each site, unless this sequence is interrupted.

The column decoder 84 continues to address each column electrode in sequence, i.e. column electrode 106, column electrode 108, etc., until it reaches the last column electrode. At that time, the sequence begins again with column electrode 106. All of the row sites along each column electrode may simultaneously be either turned on, left on, or turned off, as the case may be depending on the gray shade desired at the particular site. If a site is to be turned off, or erased, an erase pulse 58 is clocked through the logic circuitry to the row and column electrodes defining each site. Accordingly the erase pulse 58 is positioned on the back porch of the sustainer voltage waveform and causes a short discharge at that site which has the effect of reducing the wall voltage. Because of this reduction in wall voltage, at the next reversal in the sustainer voltage waveform, the voltage gradient across the site is insufficient to produce a discharge so that the site is extinguished.

It should also be understood that the present invention with some modification could be used to display an interlaced raster pattern. Additionally, the rows along each column can be grouped into subgroups for addressing purposes.

Although the invention has been shown and described with respect to a preferred embodiment thereof, it should be understood by those skilled in the art that numerous other changes and omissions in the form and detail thereof may be made without departing from the spirit and scope of the invention.

I claim:

1. A circuit responsive to analog video information in a raster format for generating gray scale variations in a plasma panel, said plasma panel having column electrodes and row electrodes, comprising:
   decoder means for addressing said column electrodes and said row electrodes;
   means for quantizing each line of analog video information into a predetermined number of levels of binary data;
   memory means for storing at least one raster of said digital video data, said memory means including one pair of recirculating means for each of two levels of binary data, one pair of which receives a separate one of said lines of video information;
   pulse means for generating a plurality of write pulses and a plurality of erase pulses; and
   gate means including an individual logic element connected to each pair of recirculating means in said memory means and also connected to receive said plurality of write pulses and said plurality of erase pulses from said pulse means for clocking selected ones of said plurality of write pulses and said plurality of erase pulses to said row electrodes of said plasma panel simultaneously while the column electrodes are addressed sequentially.

2. A circuit according to claim 1, wherein said means for quantizing said analog video signal includes a fast integrator having an output which assumes one of said predetermined number of levels and which is periodically reset by a clock, and wherein the output of the fast intergrator is converted by an A/D converter to digital data bits.

3. A circuit according to claim 2, wherein said means for storing at least one raster of video data comprises a plurality of recirculating shift registers which are connected to receive digital data bits from said A/D converter, said stored data being periodically updated with new information.

4. A circuit according to claim 3, wherein said pulse means for generating a plurality of write pulses and a plurality of erase pulses is a bistable device, and wherein said gate means include a plurality of AND gates which are connected to said bistable device and also to said recirculating shift registers in said memory means, so that each of said AND gate can be periodically enabled by the video data bits from said recirculating shift register thereby passing selected ones of said write pulses and erase pulses.

5. A circuit according to claim 4, wherein said AND gates are grouped in pairs, one pair being connected to each of said recirculating means in said memory means, and where said pairs of AND gates can be simultaneously enabled as each column electrode is addressed in sequence.

6. A circuit according to claim 5, further including a column decoder synchronously controlled by said clock to present said selected ones of said write pulses or said gate pulses which are clocked out of said gate means to all of said row electrodes along one column.

* * * * *